Oct. 3, 1944.         D. F. DALY         2,359,627
CABINET FOR ELECTRIC APPLIANCES
Filed May 23, 1942
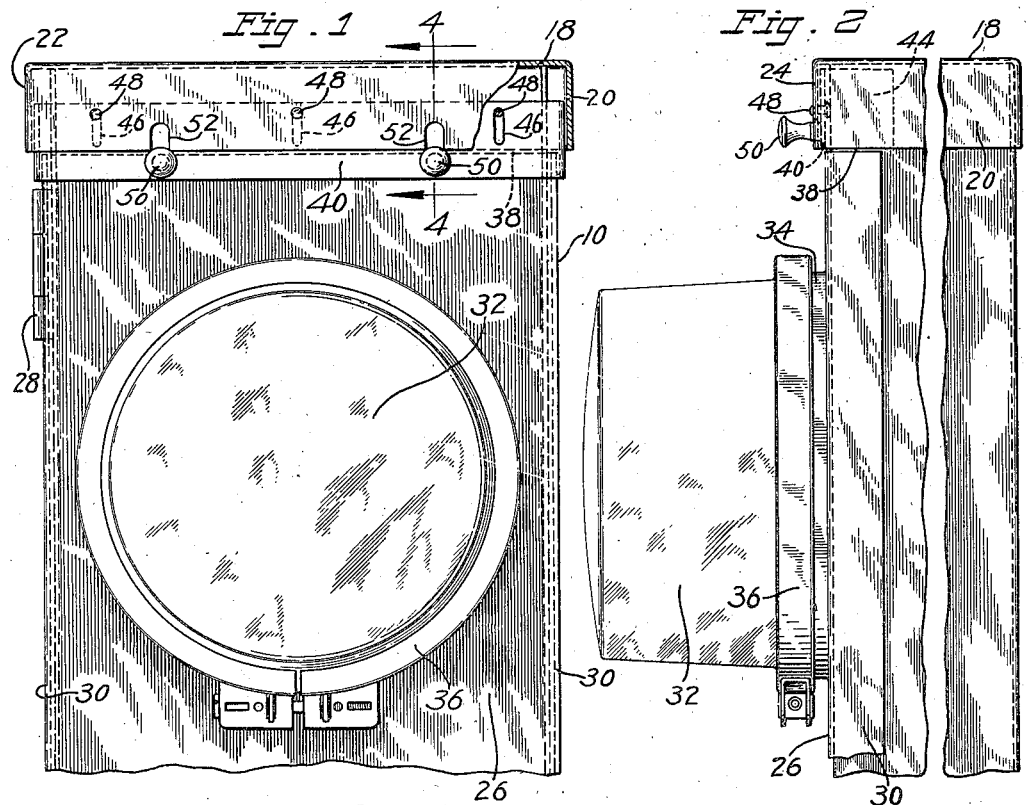
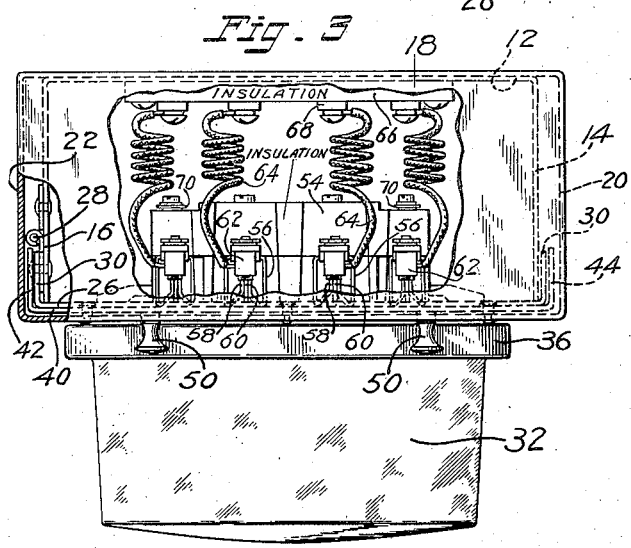
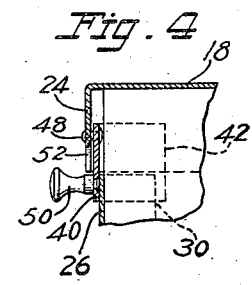
Inventor
Daniel F. Daly
By S. Jay Teller
Attorney Patented Oct. 3, 1944

2,359,627

UNITED STATES PATENT OFFICE 2,359,627

CABINET FOR ELECTRIC APPLIANCES

Daniel F. Daly, Hartford, Conn., assignor, by mesne assignments, to Federal Electric Products Company, Inc., Newark, N. J., a corporation of New Jersey Application May 23, 1942, Serial No. 444,289

8 Claims. (Cl. 171—34)

This invention relates to a cabinet or box for housing an electrical appliance and, in the preferred embodiment, a cabinet or box on which an electric meter is mounted, the box being adapted to contain a conventional electric meter terminal block.

One object of the invention is to provide an outdoor, rain-tight cabinet having a side hinged door or cover, the cover having an electric meter and jaw block mounted thereon and movable therewith.

Another object of the invention is to provide a member on the cabinet which normally covers the clearance space provided between the top of the cover and the lower front edge of the top of the cabinet whereby rain, snow, and the like may not enter the box through said clearance space.

A still further object of the invention is to provide mounting means for the member covering said clearance space which will permit said covering means to be raised and allow the main cover for the cabinet to be opened.

Other objects of the invention will be apparent from the following specification, claims, and drawing The accompanying drawing shows the embodiment of the invention which is deemed preferable, but it will be understood that the drawing is intended for illustrative purposes only and is not to be construed as defining or limiting the scope of the invention, the claims forming a part of this specification being relied upon for that purpose.

In the drawing,

Fig. 1 is a fragmentary front elevation of an electric cabinet embodying the invention, part of the top of said cabinet being broken away to expose certain details.

Fig. 2 is a side elevation of the cabinet shown in Fig. 1, part of the cabinet being broken out to shorten the view.

Fig. 3 is a top plan view of the cabinet shown in Fig. 1, part of the top being broken away in several places to respectively expose: the terminal block, jaw block, and electric connecting means; and certain details of the invention.

Fig. 4 is a fragmentary sectional elevation on the line 4—4 of Fig. 1, certain portions of the cabinet being omitted.

The present invention comprises an outdoor, rain-tight cabinet having a side hinged cover on which is mounted a meter of the outdoor type and a jaw block. The cabinet contains a conventional terminal block and flexible electric conductors connect certain terminals of the terminal block with terminals on the jaw block to connect the meter properly to the line and service circuit. Such a construction permits the cabinet to be opened for meter testing purposes or for any other purpose that may be desired without disconnection of the meter from the cover as was previously necessary in existing meter cabinets. The hinged cover thus affords a convenient support for the meter and jaw block when the cover is in open position and no additional means are required for supporting the meter while it is being tested.

In order that the cabinet may be rain-tight and thus adapted for outdoor purposes, the top is provided with integral sides or flanges depending downward from all edges to form a rain-tight means for covering the upper part of the cabinet. Clearance is provided between the upper edge of the hinged cover and the lower edge of the front flange of the top in order that the cover may be opened. Said clearance provides a space through which rain and the like can enter the interior of the cabinet and it is one of the principal objects of the present invention to provide means for covering or closing said clearance space to render the same rain-tight. Such covering or closing means comprise a vertically slidable intermediate member disposed adjacent the inner surface of the front flange of the top, said slidable member being of such dimensions that when it is in its uppermost or raised position, the top of the hinged cover will clear the lower edge of the slidable member. In its normal position, the slidable member extends below the upper edge of the hinged cover and against the outer surface of the same. Suitable means are provided to guide and limit the movement of the slidable member and manually engageable knobs or handles are also provided on the slidable member by which it may be moved.

While a cabinet of the type illustrated and described herein is primarily for use with electric meters, it is to be understood that the principles which render the same rain-tight are readily applicable to various other types of cabinets or electric appliances and particularly to cabinets for outdoor use in combination with switches, fuse blocks, and numerous other appliances.

In the drawing, the cabinet is generally designated 10 and is preferably formed of sheet metal but any other suitable material may be used. Said cabinet comprises a box-like portion having a back 12, sides 14 and 16, and a bottom which is not illustrated. The bottom, however, is similar to the sides in that it is preferably formed integrally with the back 12 and extends outward therefrom substantially the same distance as the sides.

A top 18 is secured to the upper edges of the sides and back, the top preferably being formed with sides or flanges depending from all four edges thereof and the adjoining edges of the side flanges are secured to each other in such a way that they are rain-tight. The dimensions of the top 18 are such that the flanges overhang the back, sides, and hinged front cover, to be described, of the cabinet. The side flanges 20 and 22, and also the front flange 24, respectively overhang the sides and hinged cover of the cabinet a greater amount than the back flange for purposes to be described. It will be seen that the front flange 24 partially covers the open front of the cabinet and is hereinafter referred to as an overhang.

A cover or door 26 is secured to one side of the cabinet by a plurality of hinges 28, all but one of the hinges being omitted in the present drawing. The cover 26 is provided with side and bottom flanges 30 to produce a rain-tight cover on the front of the cabinet when the cover is closed. The bottom flange of the cover 26, is omitted in the present drawing but the same is similar to the side flanges 30 in that it overlaps the bottom wall of the cabinet and is disposed adjacent the lowermost, outer surface thereof when the cover is closed.

The present illustration includes a conventional meter casing or shield 32 enclosing a meter, said meter and casing being secured to and projecting from the outer surface of the cover 26. The particular means utilized in the illustration for securing the meter casing comprises an integral annular flange 34 on the cover to which the rim of the meter casing is secured by a split collar or ring 36.

The upper edges of the cover 26 and its side flanges 30 terminate short of the lower edges of the flanges 20, 22, and the overhang 24 of the top 18 to provide a small clearance space 38 to permit the opening of the cover 26.

Said space 38 would permit the entry of rain and the like if no means were provided to prevent such entry. However, the present invention includes slidable means in the nature of a shutter or intermediate member 40 to which side members 42 and 44 are secured, the latter members extending substantially at right angles to the front or main portion of the intermediate member 40. The intermediate member 40 is of such width that it may be completely housed within the top 18 so that the lower edge of the intermediate member does not extend below the lower edges of flanges 20, 22 and overhang 24 when the intermediate member is in its raised position within the top. This is clearly shown in Fig. 2. The intermediate member 40 and its side members 42 and 44 are respectively disposed adjacent the inner surfaces of overhang 24 and side flanges 20 and 22 of the top. Said overhang and side flanges 20 and 22 are respectively adequately spaced from the outer surfaces of the front of the cover 26 and the side flanges 30 thereof to accommodate the intermediate member 40 and its side members 42 and 44 and afford sufficient clearance to permit them to be moved downward over the outer surfaces of the cover 26 and side flanges 30 a sufficient distance to adequately cover the space 38 and thus prevent the entry of rain and the like through said space.

Downward movement of the intermediate member 40 is guided and limited by guide means comprising a plurality of slots 46 provided in the front portion of the intermediate member. The guide means also comprise a plurality of rivets 48, or the equivalent thereof, which are secured at one end to the inner surface of the overhang 24 and pass through the slots 46 of the intermediate member. The opposite or inner end of each of the rivets 48 is headed to properly retain the intermediate member thereon. The upper ends of the slots 46 engage the rivets 48 to limit the downward movement of the intermediate member with respect to the overhang 24.

The intermediate member 40 is also provided on its front surface with a plurality of manually engageable handles or knobs 50 which are rigidly secured thereto and provide means by which the intermediate member may be moved. The lower portion of the overhang 24 is provided with openings in the form of notches 52 which extend inward from the lower edge of the overhang, the notches receiving the knobs 50 when the intermediate member is raised to the position shown in Fig. 2.

The cabinet may be provided with any convenient type of conventional latch for securing the cover 26 in its closed position with respect to the remainder of the cabinet. Such latch means is not shown in the present drawing. In effect, the intermediate member when in its lowered position shown in Figs. 1 and 4 serves as a supplemental latch means or may even be used as the only latch means for retaining the cover in closed position.

The intermediate member thus constitutes a very effective means for closing or covering the space 38 and preventing the entry of rain or the like therethrough. In effect, as is particularly advantageously shown in Fig. 4, the overhang, the intermediate member, and the cover 26 present a lapped shingle effect. Since the slots 46 are laterally spaced from the notches 52, it is not possible for rain to enter the interior of the cabinet through said slots as the lower end of said slots never extends below the lower edge of the overhang 24. Additional assurance against the entry of rain through the space 38 is afforded by the provision of side members 42 and 44 which are preferably formed integrally with the main or front portion of the intermediate member 40. Said side members 42 and 44 are positioned closely adjacent the sides 14 and 16 of the cabinet, there only being sufficient space between said side members and sides to accommodate the flanges 30 of the cover.

A jaw block 54 is fixed to the inner side of the cover 26, the jaw block being formed of insulation material. The jaw block is provided with a plurality of spring contacts 56 which are insulated from each other and are respectively provided with opposed contacting surfaces 58 adapted to slidably receive therebetween one of a plurality of prong contacts 60 projecting from the inner end of the meter. Electrically connected to each of the spring contacts 56 is a terminal 62 to which one end of a flexible connector or conductor 64 is electrically connected.

A terminal block 66 formed of insulation material is secured to the back of the cabinet. A plurality of stationary line and service terminals 68 are mounted on said terminal block. The other end of each of the flexible conductors 64 is connected to one of the terminals 68 to thus electrically connect the meter into the line and service circuits which enter the cabinet 10. The flexible condutors 64 are primarily for the purpose of permitting the cover 26 to be opened while the meter and jaw block are in situ thereon and without disconnecting the meter from the line and service circuits.

The particular jaw block illustrated in Fig. 3 is provided with circuit closing bars 60 which permit the meter to be disconnected from the cover and jaw block without disrupting the line and service circuit.

It will thus be seen that the present invention provides an outdoor, rain-tight cabinet having a side hinged cover on which are mounted a meter, meter casing, and jaw block which are moved with the cover when it is desired to open the cabinet for purposes of testing the meter, inspecting the electrical connections, connecting or disconnecting conductors from the various terminals within the cabinet, or for any other purposes. The side hinged cover affords a very convenient mounting for the meter when it is desired to test the same and no supplementary mounting or holding means are required for the meter as would be the case were the cover completely removable from the cabinet or were the cover hinged to the top of the cabinet. Furthermore, when the cover is moved to open position, the inner end of the meter and jaw block are conveniently exposed in a readily accessible position for purposes of testing or for any other purpose where it is desired to obtain access to the jaw block or inner end of the meter. Still further, the slidable intermediate member 49 which normally closes the clearance space to render the same rain-tight, when the cover 26 is closed, affords an effective means for preventing the entry of rain and the like through said clearance space and also provides a supplementary closure fastener for the cover 26 when the slidable intermediate member is in its normal position illustrated in Fig. 1.

In the foregoing description of the invention, it has been presumed that the cabinet will be mounted substantially in the position illustrated in Figs. 1 and 2 of the drawing and, accordingly, the terms used in the foregoing such as "upper," "lower," "upward," "downward," "front," "back," and the like are used in a sense relative to the position of the cabinet illustrated in said figures. In order that the intermediate member will be most effective as a rainshield, the cabinet should be mounted approximately in the position illustrated in Figs. 1 and 2. This may be termed a substantially vertical position. It will be understood, however, that the intermediate member may still function as a rainshield if the box is not mounted vertically but is mounted at somewhat of an angle to the position illustrated in Figs. 1 and 2.

While the invention has been illustrated and described in its preferred embodiment and has included certain details, it should be understood that the invention is not to be limited to the precise details herein illustrated and described since the same may be carried out in other ways, falling within the scope of the invention as claimed.

What I claim is:

1. A cabinet for an electric appliance comprising a box-like member having a front opening and a top provided with an overhang at least coextensive with said opening in a horizontal direction and extending downward to partially cover said opening, a cover hingedly connected at one side to the box and adapted when in one position to cover the remaining uncovered portion of said front opening, the upper edge of said cover clearing the lower edge of the overhang when the cover is moved with respect thereto, and an intermediate member substantially coextensive horizontally with said overhang and slidably mounted adjacent the inner surface thereof, said intermediate member normally extending above the lower edge of said overhang and below the upper edge of and over the outer surface of said cover and said intermediate member also being slidable upward until its lower edge clears the upper edge of the cover, whereby the cover may be moved to open position.

2. A cabinet for an electric appliance comprising a box-like member having an open front and a top provided with an overhang extending downward to partially cover said open front, said overhang extending across the full width of the open front, a cover hingedly connected to one side of the box and adapted to cover the remaining uncovered portion of said open front, the upper edge of said cover clearing the lower edge of the overhang when the cover is moved with respect thereto, and an intermediate member slidably disposed with respect to the inner surface of the overhang and extending across the full width of said open front, said intermediate member normally extending below the upper edge of and over the outer surface of said cover and adapted to be moved upward to clear the upper edge of the cover and permit the cover to be moved to open position.

3. A cabinet for an electric appliance comprising a box-like member having an open front and a top provided with an overhang extending downward to partially cover said open front, said overhang extending across the full width of the open front, a cover hingedly connected to one side of the box and adapted to cover the remaining uncovered portion of said open front, the upper edge of said cover clearing the lower edge of the overhang when the cover is moved with respect thereto, and an intermediate member slidably disposed with respect to the inner surface of the overhang and including a front portion extending across the full width of the open front and side members joined to said front portion and respectively disposed adjacent the outer surface of the sides of the box-like member, said intermediate member normally extending below the upper edge of and over the outer surface of said cover and adapted to be moved upward to clear the upper edge of the cover and permit the cover to be moved to open position.

4. A cabinet for an electric appliance comprising a box-like member having a front opening and a top provided with an overhang at least coextensive with said opening in a horizontal direction and extending downward to partially cover said opening, a cover hingedly connected at one side to the box and adapted when in one position to cover the remaining uncovered portion of said front opening, the upper edge of said cover clearing the lower edge of the overhang when the cover is moved with respect thereto, an intermediate member substantially coextensive horizontally with said overhang and slidably mounted adjacent the inner surface thereof, said intermediate member normally extending above the lower edge of said overhang and below the upper edge of and over the outer surface of said cover and said intermediate member also being slidable upward until its lower edge clears the upper edge of the cover, whereby the cover may be moved to open position, and manually engageable means carried by said intermediate member and by which said member may be moved as described.

5. A cabinet for an electric appliance comprising a box-like member having an open front and a top provided with an overhang extending downward to partially cover said open front, said overhang extending across the full width of the open front and having an opening in the lower portion thereof, a cover hingedly connected to one side of the box and adapted to cover the remaining uncovered portion of said open front, the upper edge of said cover clearing the lower edge of the overhang when the cover is moved with respect thereto, an intermediate member slidably disposed with respect to the inner surface of the overhang and extending across the full width of said open front, said intermediate member normally extending below the upper edge of and over the outer surface of said cover but adapted to be slidably moved upward to clear the upper edge of the cover and permit the cover to be moved to open position, manually engageable means extending outward from the outer surface of said intermediate member and by which the same may be moved, said opening disposed in the lower portion of said overhang receiving said manually engageable means during the raising of said intermediate member to clear the upper edge of the cover.

6. In combination with an outdoor cabinet having one open face and a cover hinged to said cabinet and adapted to be moved to closed position to cover said open face, an electric meter shield carried solely by said cover for enclosing a meter adapted to be mounted on and solely supported by said cover, said shield being adapted to render said meter rain-tight, a jaw block carried solely by said cover and exposed to the interior of the cabinet when the cover is closed, said jaw block being adapted to be electrically connected to said meter and remain connected thereto when the cover is in either open or closed positions, and means cooperating with adjacent portions of said cabinet and cover when said cover is in closed position to render the interior of the cabinet rain-tight.

7. In combination with an outdoor cabinet having one open face and a cover hinged to said cabinet and adapted to be moved to closed position to cover said open face, an electric meter shield carried solely by said cover for enclosing a meter adapted to be mounted on and supported solely by said cover, said shield being adapted to render said meter rain-tight, a jaw block carried solely by said cover and exposed to the interior of the cabinet when the cover is closed, said jaw block being adapted to be electrically connected to said meter and remain connected thereto when the cover is in either open or closed positions, a terminal block mounted within said cabinet, flexible conductors electrically connecting said jaw block and terminal block, said flexible conductors being of sufficient length to permit relative separation of said blocks as when said cover is moved to fully opened position, whereby the circuit extending from said terminal block and through said jaw block and meter remains continuous when said cover is in either open or closed positions, and means cooperating with adjacent portions of said cabinet and cover when said cover is in closed position to render the interior of the cabinet rain-tight.

8. In combination with an outdoor cabinet having one open face and a cover hinged to said cabinet and adapted to be moved to closed position to cover said open face, an electric meter shield carried solely by said cover for enclosing a meter adapted to be mounted on and solely supported by said cover, said shield being adapted to render said meter rain-tight, a jaw block carried solely by said cover and exposed to the interior of the cabinet when the cover is closed, said jaw block being adapted to be electrically connected to said meter and remain connected thereto when the cover is in either open or closed positions, and means movably carried by said cabinet and cooperating with adjacent portions of said cabinet and cover when said cover is in closed position to render the interior of the cabinet rain-tight and also releasably maintain said cover in closed position, said means when removed from said cooperating position permitting the opening of said cover.

DANIEL F. DALY.